Figure 1:
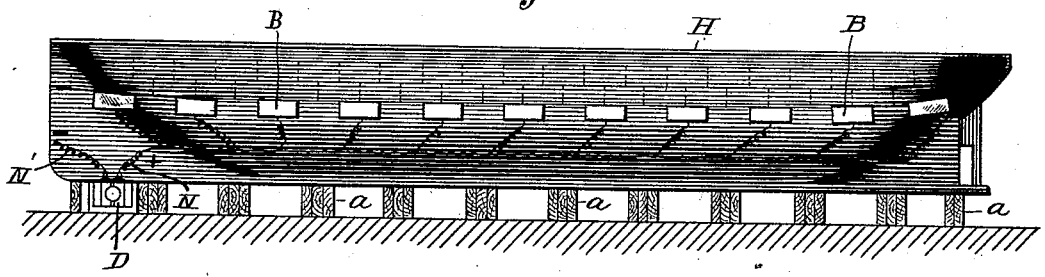

(No Model.) 7 Sheets—Sheet 1.

T. S. CRANE.
COPPER COATING THE HULLS OF VESSELS.

No. 498,707. Patented May 30, 1893.

Attest:
Co. F. D. Crane.
J. Henry Rieberath.

Inventor.
Thomas. S. Crane.

(No Model.) 7 Sheets—Sheet 2.

T. S. CRANE.
COPPER COATING THE HULLS OF VESSELS.

No. 498,707. Patented May 30, 1893.

Attest:
W. F. D. Crane
J. Henry Thebenath

Inventor.
Thomas S. Crane, (No Model.) 7 Sheets—Sheet 3.
T. S. CRANE.
COPPER COATING THE HULLS OF VESSELS.
No. 498,707. Patented May 30, 1893.
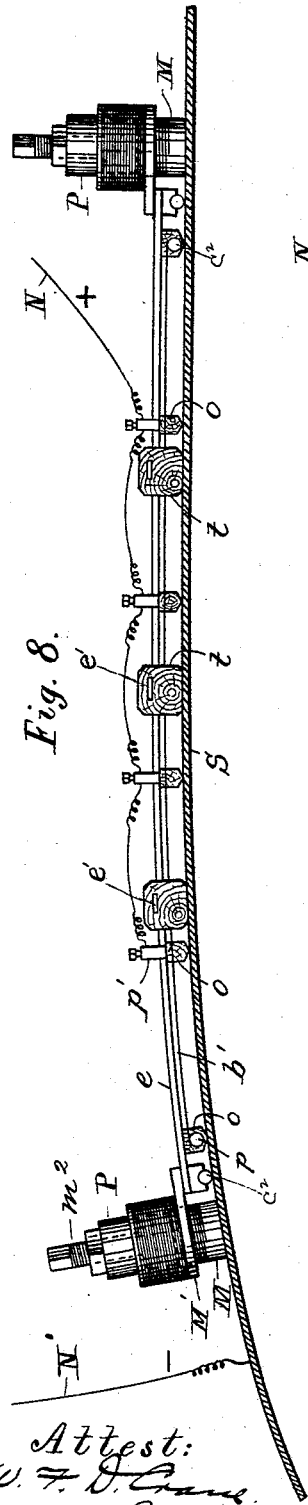
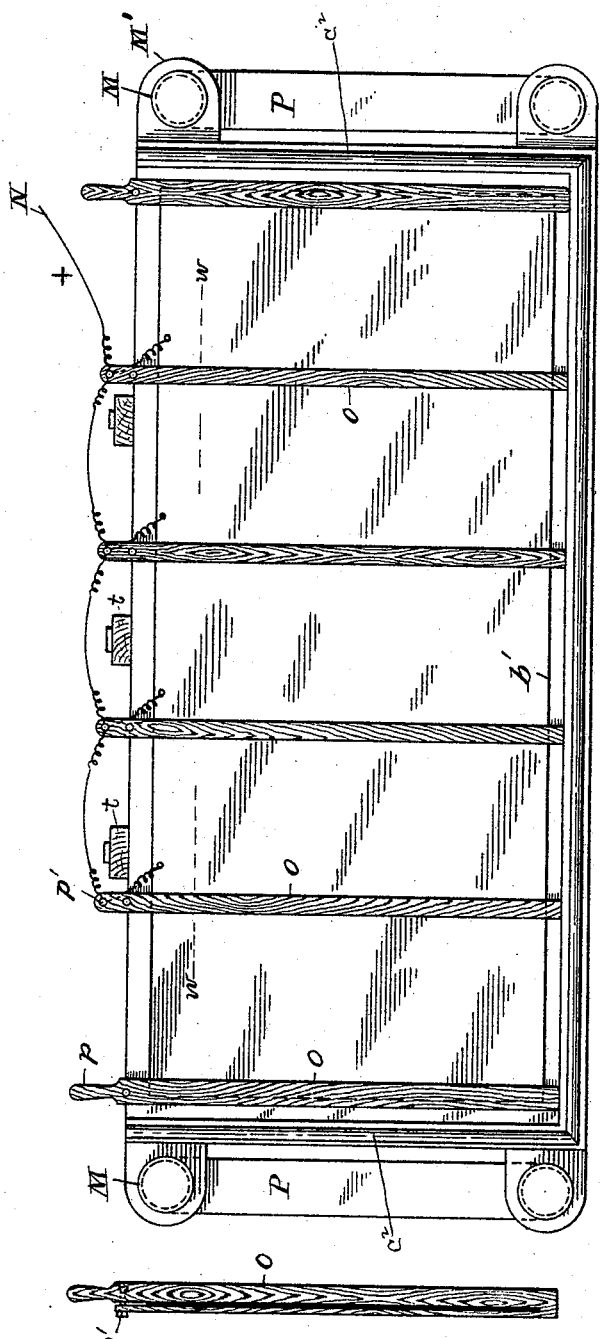
Attest:
W. F. D. Crane
J. Henry Theberath
Inventor.
Thomas S. Crane.

(No Model.) 7 Sheets—Sheet 4.
T. S. CRANE.
COPPER COATING THE HULLS OF VESSELS.
No. 498,707. Patented May 30, 1893.
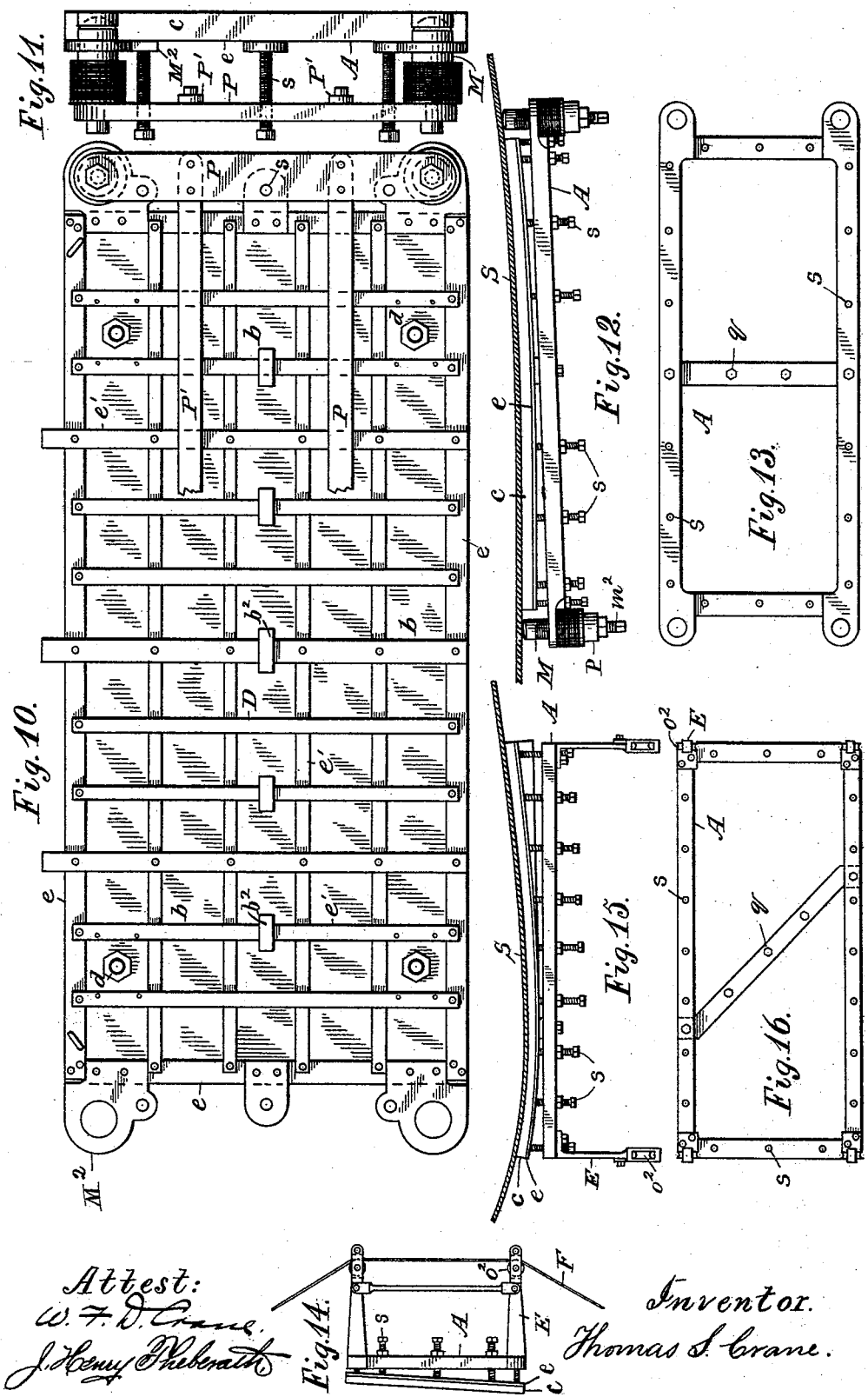
Attest:
W. F. D. Crane
J. Henry Theberath
Inventor.
Thomas S. Crane.
THE NORRIS PETERS CO., PHOTO-LITHO., WASHINGTON, D. C.

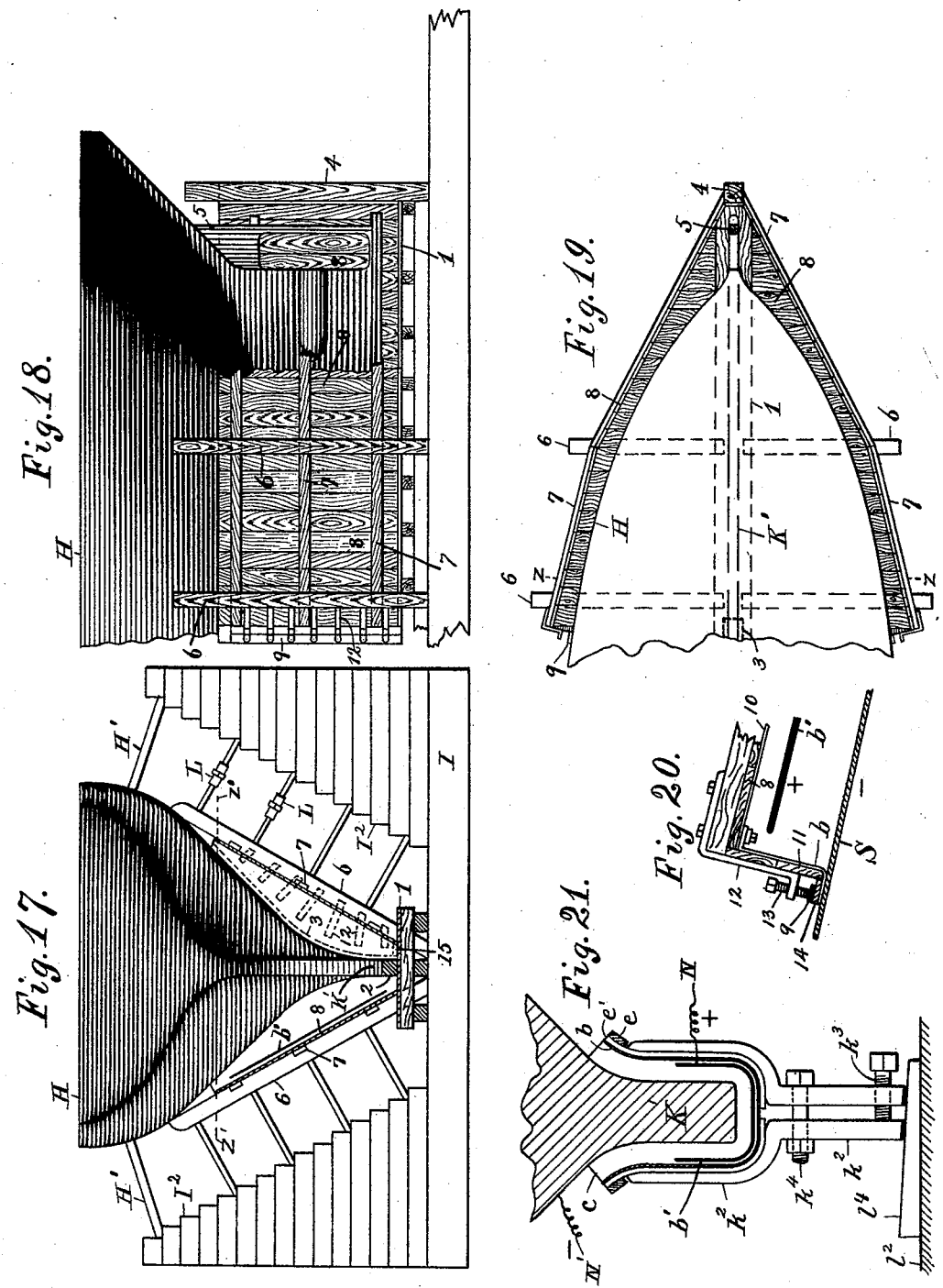

(No Model.) 7 Sheets—Sheet 6.
T. S. CRANE.
COPPER COATING THE HULLS OF VESSELS.

No. 498,707. Patented May 30, 1893.

Attest:
W. F. D. Crane
J. Henry Rebirath

Inventor.
Thomas S. Crane.

(No Model.) 7 Sheets—Sheet 7.

T. S. CRANE.
COPPER COATING THE HULLS OF VESSELS.

No. 498,707. Patented May 30, 1893.

Attest:
Edw. F. Kinsey
J. Henry Theberath

Inventor.
Thomas S. Crane

UNITED STATES PATENT OFFICE.

THOMAS S. CRANE, OF EAST ORANGE, NEW JERSEY.

COPPER-COATING THE HULLS OF VESSELS.

SPECIFICATION forming part of Letters Patent No. 498,707, dated May 30, 1893.

Application filed October 12, 1892. Serial No. 448,628. (No model.)

*To all whom it may concern:*

Be it known that I, THOMAS S. CRANE, a citizen of the United States, residing at East Orange, Essex county, New Jersey, have invented certain new and useful Improvements in Copper-Coating the Hulls of Vessels, fully described and represented in the following specification and the accompanying drawings, forming a part of the same.

The object of this invention is to facilitate the deposition by electricity of a metallic coating upon the surface of a large object.

By this invention an object like the hull of a large iron ship, which cannot be conveniently immersed in a bath of electro-plating solution, is provided with an integral coating by depositing the metal upon definite portions or sections of the surface successively and causing the deposits to overlap upon one another. I have found that sections thus overlapped are perfectly united at their junction; so that the entire coating upon the object, whatever the extent of its surface, becomes an unbroken metallic sheet.

The metal sheathing heretofore used for covering the bottoms of wooden vessels is formed in sheets which are secured to one another only by the nails used at the joints, and it is obvious that a continuous or integral coating would possess greater strength with the same thickness, and need not be of the thickness heretofore used to possess the same strength.

The invention consists partly in the methods I have devised for depositing an integral coating upon a large surface in sections, partly in the means for applying a bath of plating solution to a definite portion or section of the surface, and partly in the means for retaining the solution within the bath holder in contact with the under surface of an object, as the bottom of a ship.

Different examples of my appliances are illustrated herein, but others may be devised to practice the invention.

Figure 2:
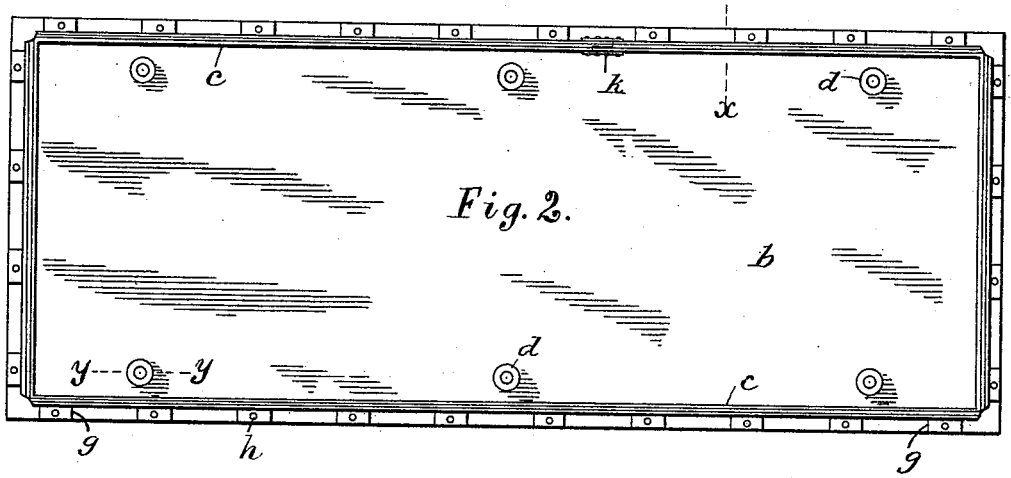
Figure 3:
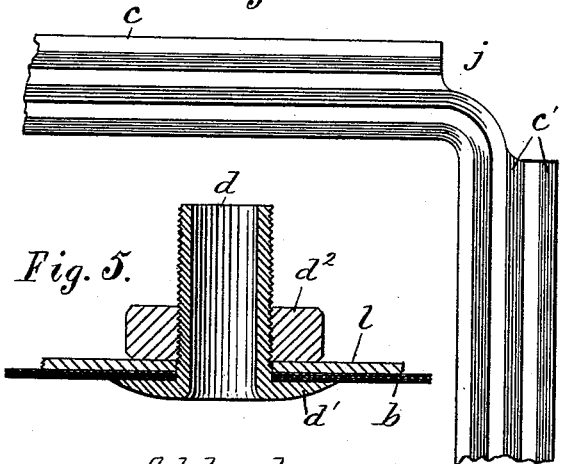
Figure 5:
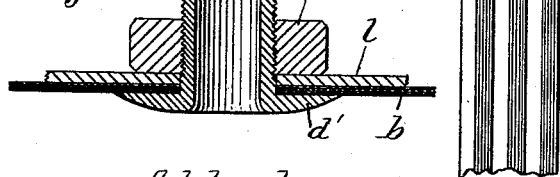
Figure 4:
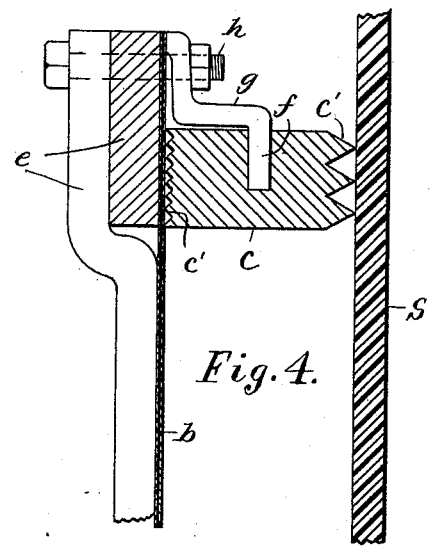
Figure 6:
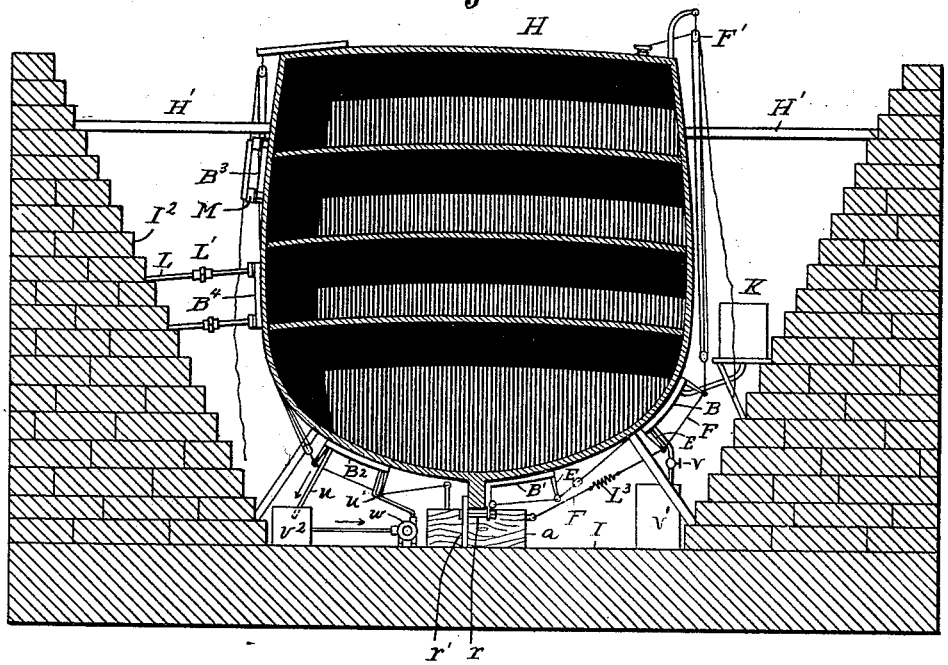
Figure 7:
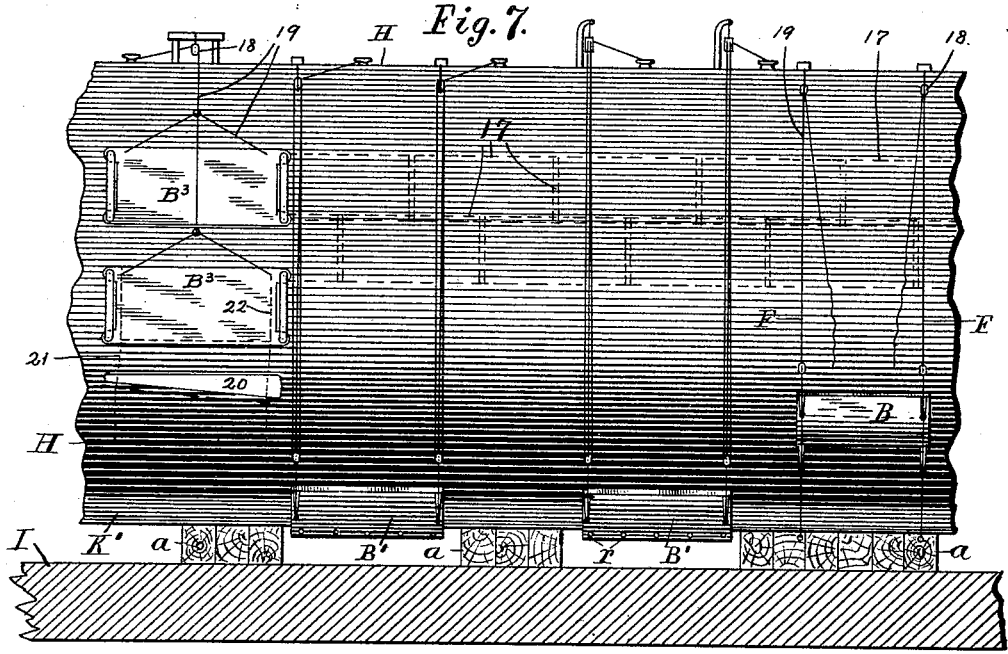
Figure 22:
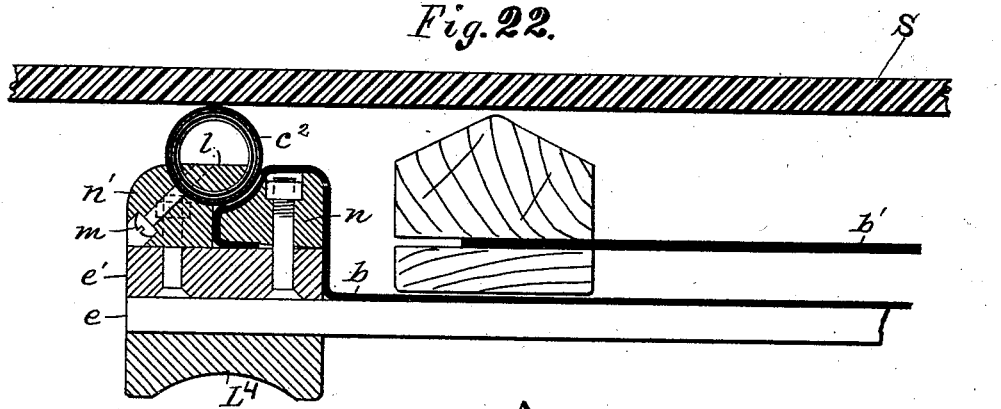
Figure 23:
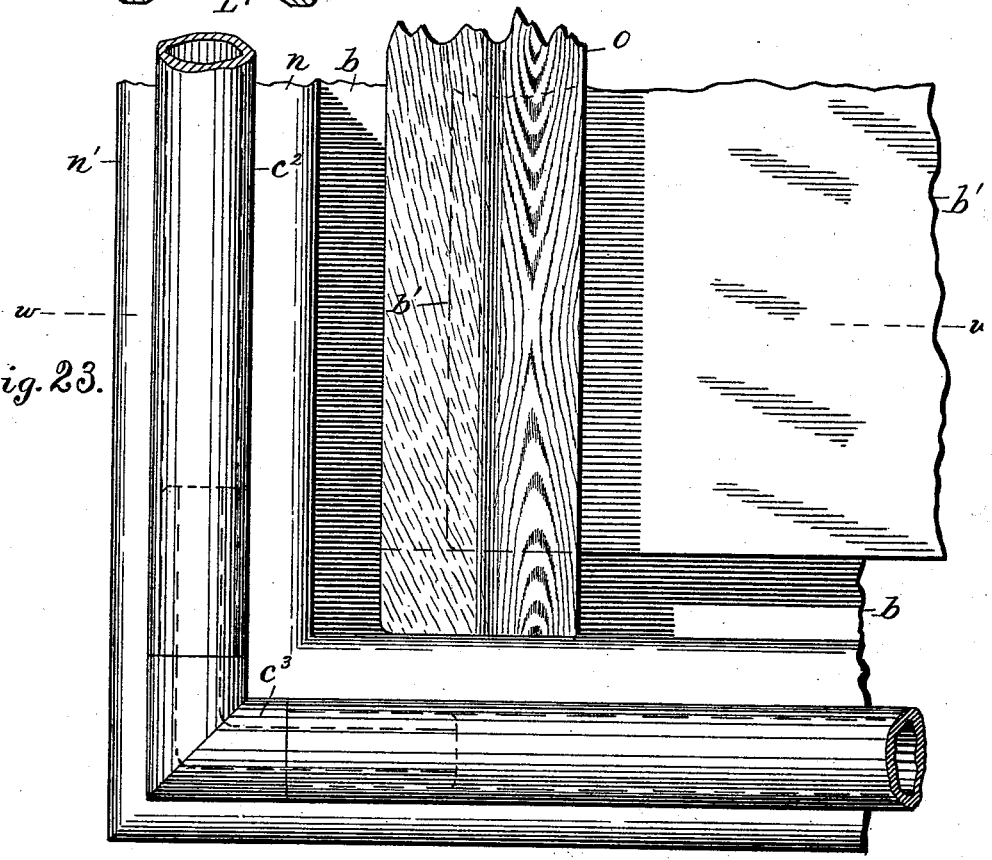
Figure 24:
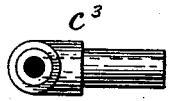
Figure 25:
Figure 26:
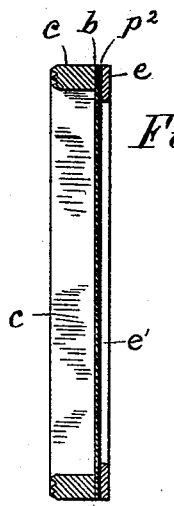
Figure 27:
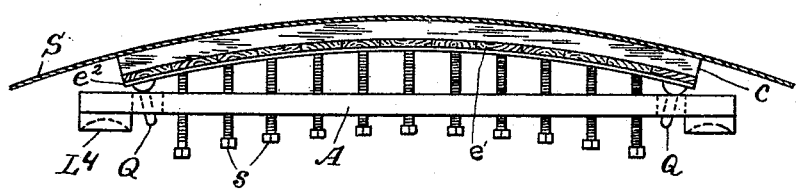
Figure 28:
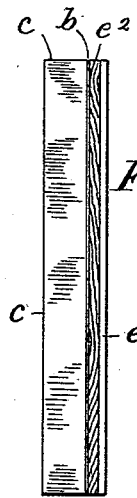
Figure 29:
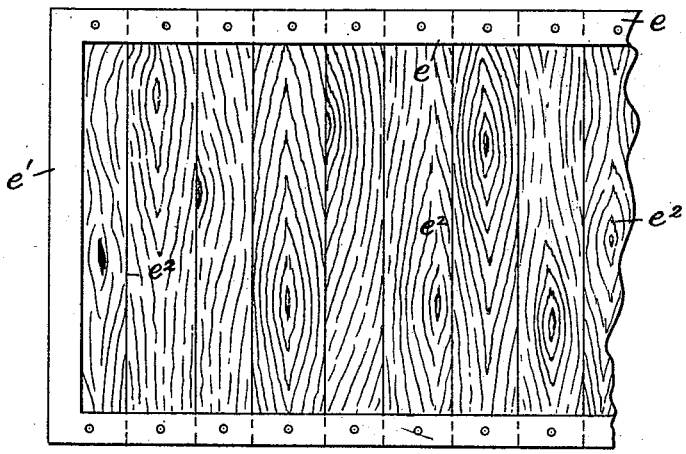

In the drawings, Figure 1 is a diagram of a ship's hull with a series of bath holders applied thereto. Fig. 2 shows the inner side of one of the bath holders. Fig. 3 represents the packing at one corner of the bath holder. Fig. 4 is a section of one edge of the bath holder taken on line $x, x,$ in Fig. 2. with a portion of the vessel's skin. Fig. 5 is a section on line $y, y,$ in Fig. 2, through one of the inlet thimbles. Fig. 2 is drawn upon a much larger scale than Fig. 1, and the details in Figs. 3, 4 and 5 upon a still larger scale. Fig. 6 is a midship section of a vessel in a dry dock with several bath holders applied to the hull. Fig. 7 shows a portion of the vessel amid ship, in side elevation, supported in a dry dock, with several bath holders secured upon the hull. Fig. 8 is a plan, and Fig. 9 an inside view of a bath holder provided with electro magnets at the corners, and having the anode insulated therein. Fig. $9^a$ is an end view of the anode with one of the insulators. Fig. 10 is an outside view of a bath holder similar to that shown in Figs. 8 and 9, but having the magnets combined with an abutment frame, the frame and one magnet being omitted at the left side of the figure. Fig. 11 is an end view of the same taken at the right hand end. Fig. 12 is an edge view of an auxiliary abutment frame provided with magnets at the corners and having a bath holder attached to it transversely at the middle. Fig. 13 is an elevation of the abutment frame detached from the other parts. Figs. 14 and 15 are an end view and plan of a bath holder having an abutment frame provided with pulley arms at the corners, and Fig. 16 is an elevation of the abutment frame and pulley arms. Fig. 17 shows the stern of a vessel in dry dock with a bath holder applied thereto, the bath holder being shown in section on line $z, z,$ in Fig. 19. Fig. 18 is a side elevation of the same parts with a portion of the bath holder broken away. Fig. 19 is a plan of the bath holder with a horizontal section of the stern of the vessel on line $z', z',$ in Fig. 17. Fig. 20 is a plan of one of the screws for pressing the packing against the skin of the vessel. Fig. 21 is a cross section of a keel bath holder adjacent to one end, with the keel in section within the bath. Fig. 22 represents one corner of a bath holder with a portion of the skin of a vessel and the anode in section on line $w, w,$ in Fig. 23, which shows the lower corner of the bath holder upon its inner side. Fig. 24 is a plan view of one of the elbows or junction pieces for the corner of the packing. Fig. 25 is an elevation of one of the extension shores and spring shoe in section at the center line where hatched. Fig. 26 is a transverse section of a bath holder made of sheet metal. Fig. 27 is a plan of a bath holder formed chiefly of wooden strips. Fig. 28 is an end elevation, and Fig. 29 shows the outside of the bath holder at one end.

In Fig. 1, H is the hull of the vessel and B the sectional bath holders, eleven of which are shown in a series arranged along the side of the vessel.

D indicates an electric generator or dynamo the negative conductor N' of which is connected to the bow of the vessel, and the positive conductor N is connected in multiple arc with the series of bath holders. The vessel is shown supported upon blocks $a$, as would be requisite in a dry dock; but the bath holders may be applied to the vessel before it is launched if desired.

To form a bath holder adapted to retain the plating solution in contact with a definite portion of the surface, I provide a frame having a waterproof lining, and provide the margin of the frame with a packing adapted to hold the lining at a suitable distance from the skin of the vessel. The packing is adapted to make a tight joint with the skin of the vessel, and an anode is inserted within the solution to convey the electric current to the solution.

Fig. 2 shows the inner side of a rectangular bath holder which for a large vessel may be made four feet wide and ten feet long.

$b$ designates the lining of the bath holder; $c$ in Fig. 2, the packing, and $d$ are thimbles by which the plating solution may be introduced or withdrawn at pleasure. A corner of the frame $e$ of the bath holder is indicated in Fig. 4, with the lining $b$ stretched flat upon the same. The packing $c$ shown in Fig. 4 is constructed entirely separate from the lining, being made as a rectangular strip of india-rubber or other yielding fabric, with longitudinal corrugations $c'$ upon its opposite edges, and a rectangular groove $f$ formed upon its outer side. The packing is set within the margin of the frame to leave a seat for securing clamps to hold the packing in place. The clamps are shown in the form of clips $g$ which are fitted to the groove $f$ and are secured to the frame outside of the packing by screws or bolts $h$. Such a packing may be made in pieces of any convenient length and may be cut off to form the border of a given bath holder, being bent at the corners after notching the same, as indicated at $j$ in Fig. 3, and its ends united by a half lapped joint with plates riveted over the same, as at $k$ in Fig. 2. When such a frame is pressed toward the skin of the vessel (indicated by the letter S in Fig. 4) the edges of the packing yield readily owing to their corrugated structure, and thus form a tight joint between the bath holder and the surface to which it is applied. The lining $b$ of the bath holder may be made of india-rubber or any waterproof fabric, which owing to the construction may be used in perfectly flat sheets. By holding the packing upon the margin of the bath holder by suitable clamps, the perforation of the packing and the lining where in contact with the same, is avoided, and the liability to leakage from such perforations is prevented.

Where the thimbles $d$ are inserted through the lining, the frame, whatever its construction in other respects, is provided with a suitable plate or support indicated at $l$ in Fig. 5, upon which the packing may be clamped between the head $d'$ of the thimble and a nut $d^2$ outside of the plate.

The bath holder shown in Fig. 2 with a packing around its entire margin is adapted for application to a sloping or nearly level surface, but where the bath holder is applied to a nearly vertical surface, the packing may be omitted at its upper edge, and blocks or stays inserted in place of the same to hold the upper edge of the bath holder at a suitable distance from the surface to which it is applied. Such a construction is shown in Figs. 22 and 23, which illustrate in detail the kind of bath holder which is shown in Figs. 8, 9 and 10, consisting in a frame formed of longitudinal bars $e$ and transverse bars $e'$. Such frame may have intermediate bars to form a grating between the marginal bars $e$ and support the lining $b$ against the internal pressure as in Fig. 10. The margin of the bath holder is shown in this construction provided with two wooden strips $n$, $n'$, with the lining wrapped around the inner strip $n$ and the outer strip $n'$ clamped closely by the side of the same. The adjacent edges of the two strips are grooved to receive a tubular packing $c^2$, which is secured in place by an interior gib $l$ and screws $m$ extended through the strip $n'$. Such construction requires the fitting of the lining upon its corners and four edges to the strips, but admits the use of a rubber hose as a convenient form of flexible packing, with special elbows $c^3$ to join the hose at the corners, (see Fig. 24.) Such hose can be obtained when required in the open market, whereas, the packing $c$ shown in Fig. 4 requires to be specially made for the purpose. The tubular packing $c^2$ is shown at the margin of the bath holder in Fig. 8, and as such packing is applied to only three sides of the same, means is provided to hold the top edge at an equal distance from the skin S of the vessel, to provide suitable space for the anode.

In Fig. 10, some of the transverse frame bars $e'$ are shown projected beyond one edge of the frame, to receive insulating blocks $t$, as shown in Fig. 8, which thus serve to hold the top of the bath parallel with the skins S of the hull. Such blocks or any equivalent means may be used where the packing is omitted at one edge of the bath.

The view of the bath holder in Fig. 10 exhibits merely the outer side of the bath holder with the magnets attached to the frame; the other attachments of the bath holder being shown in Figs. 8 and 9 in connection with the skin of the vessel. An anode $b'$, as a sheet of copper, is shown in Figs. 8, 9, and 22, provided with insulators consisting each in a strip of wood $o$ split from one end nearly to the other, and having the divided parts pressed together to clamp the anode, by means of a screw $o'$. The wood is made of much greater thickness upon one side of the anode, to hold it at a suitable distance, as two or three inches, from the surface to be plated, the wood upon the opposite side of the electrode affording merely a space for the circulation of the plating fluid. Where the lining of the bath holder is formed entirely of non-conducting materials, as india-rubber, the electrode may be laid directly upon the same, which is also admissible where the lining or any of its attachments is made of metal, if the frame of the bath holder is wholly insulated from any negative conductor. In such case, the frame and anode may be connected alike with the positive conductor. A portion of the wooden insulators are provided with handles $p$ which may be projected from the upper side of the bath holder when the same is used in a nearly vertical position, and binding posts $p'$, connected with the positive conductor G and with the anode, are shown attached to other of the insulators. Where the bath holder is formed, as in Fig. 2, with its entire margin inclosed, the anode would be inclosed within the bath holder, and the positive conductor extended through some portion of the bath holder, by any well known means, into contact with the same.

In Fig. 8, the bath holder illustrated in Fig. 9 is shown applied to a portion of the vessel's skin S, having a convex surface. It is obvious that a straight frame if made of steel or other highly elastic material, would be pressed firmly against such convex surface over the greater part of its length, if bent by pressure until parallel with the surface. The frame in Figs. 8 and 9 is shown provided at the corners with electro magnets M having screw threads fitted to lugs M' upon the frame. Such magnets when made of proper proportions are capable of such adhesion to the skin of an iron vessel so as to hold the frame in the position shown, and in any suitable location. The magnets are provided with shanks $m^2$ by which they may be screwed through the lugs M', and the bath holder may thus be adjusted at the ends into the desired contact with the surface to which it is applied. Such a construction, while adapted for a smooth surface of sufficient convexity, furnishes no means for adjusting the packing independently at different points upon the margin of the frame, so as to stop a leak when a defective joint is formed. Such means of adjusting the packing is provided in an abutment, which may be attached to the frame as in Figs. 12 to 15, or may be separate from the same, upon any fixed object, as in the dry dock illustrated in Figs. 6 and 17.

In Figs. 11 to 16, the abutment is an auxiliary frame A attached to the bath holder across its middle line by bolts $q$, and provided with numerous set screws $s$ adapted to press upon the margin of the bath at frequent intervals to adjust the packing independently at such points. In Figs. 11 to 13, the abutment A is provided with magnets M for securing it to the skin of the vessel, the magnets being adjustable to bring the middle of the frame into close contact with the surface, and the remainder of the frame being pressed into the desired contact by means of the screws $s$. The pole pieces M of the magnets in Figs. 10 and 11, are shown attached to the opposite ends of bars P which are connected by tie bars P'. The pole pieces are freely movable through lugs $M^2$ upon the bath holder, and the ends of the bath are actuated by set screws $s$ inserted through the magnet bars P. With this construction the pole pieces with their bars P and P' may be fixed rigidly to the skin of the vessel when the latter is of convex form, and the entire bath holder then pressed firmly against the surface by the set screws $s$ at the opposite ends. The bath holder formed with a grating of elastic metallic bars is best adapted for use upon a highly convex surface where no abutment is required, but where an abutment is used a very cheap and flexible form of frame for the bath holder is made by attaching two metallic bars to a series of wooden strips, which are free to bend independently of one another. Such construction is shown in Figs. 27 to 29, the two bars $e$ being connected at their ends by bars $e'$ and secured to the series of wooden strips or boards $e^2$. The boards are shown provided with the waterproof lining $b$ and packing $c$ like that in Fig. 4. A highly flexible frame adapted to use with an abutment, or with analogous means for tightening the packing at various points, may be made by securing a thin plate of iron to the bars $e$, $e'$, which construction is indicated in longitudinal section in Fig. 26.

In Figs. 14 to 16, a bath holder is shown attached to an abutment frame A having braces or arms E projected from its outer surface with pulleys $o^2$ in their ends to receive a rope F. The abutment frame is formed with an oblique bar for the bolts $q$, so as to bend the bath holder readily to fit a warped surface, as indicated in Figs. 14 and 15. With such a construction the bath holder may be pressed against any convex portion of a vessel by a rope tangential to the surface of the hull; as indicated in Fig. 6, where a mid section of a hull is shown resting upon the keel-blocks $a$ upon the floor I of a dry dock. A rope F is shown attached to the end of a keel-block and extended over the arms E upon a bath holder B upon the right hand side of the hull. A rope tackle F' is shown to tighten the rope tangential to the hull; and other equivalent means, as a screw bolt may be used for such purpose. Two or more wire ropes may by such means be extended over the outer side of a bath holder and operated to hold it with great firmness in the desired position. A tank K of electro plating solution is shown supported a little above the level of the bath holder B, and the upper part of the bath holder is connected therewith by a pipe. An outlet pipe having a cock $v$ is connected with the lower part of the bath holder and arranged to discharge into a receptacle $v'$. By properly regulating the cock, a slow current of the plating solution may be conducted continuously through the bath holder; which greatly hastens the electro deposition upon the surface to be plated. On the right hand side of the keel a bath holder B' is shown formed of angular shape, its lower member being adapted to fit one side of the keel, and its upper member to fit the bottom of the vessel adjacent thereto.

The lower member of the bath holder is clamped firmly to the hull by means of bolts $r$ passed through the edge of the bath and through strips $r'$ upon the opposite side of the keel, and the upper member of the bath holder is shown pressed to the bottom of the hull by a rope like the other bath holder upon the same side of the hull. Upon the bottom of the vessel at the left side of the keel, is shown a bath holder $B^2$ pressed toward the surface by a rope tackle like the bath holder B in the same figure, and the upper part of the bath holder is shown connected with a receptacle $v^2$ by an outlet pipe $u$. A pump $w$ is arranged to draw the plating solution from the receptacle, and is connected with the lower edge of the bath holder $B^2$ by a pipe $u'$, so as to force the solution continually through the bath into the receptacle.

By the use of the pump thus connected, or the tank K sustained above the level of the bath holder and discharging through the same by a regulated flow, the solution within the bath holder is held under a sufficient pressure to force it into continuous contact with the surface of the hull. The bottom of an object may thus be kept constantly bathed by the solution so as to receive the metallic deposit therefrom in the desired manner. Upon the left side of the hull a bath holder $B^3$ is shown secured to the skin of the vessel by the electro magnets M, and a bath holder $B^4$ is shown beneath the same with expansion shores L inserted between the bath holder and the steps $I^2$ of the dry dock. The shores as illustrated in Fig. 25, are provided with shoe $l^2$ and a screw shank $l'$ and nut $L'$, which when turned, extend or lengthen the shores and thus operate to press the bath holder or an abutment frame toward the hull as desired.

In Figs. 22 and 27 concave sockets $L^4$ are shown upon the outer side of the bath holder near the end, and such sockets are adapted to receive the end of the shore L and to thus hold the shores in their desired relation to the bath holder. A spring $L^3$ is shown inserted between a collar upon the shank $l'$ and the shoe, and the extension of the shore thus operates to compress the spring and thereafter maintains an elastic pressure against the bath holder to which the shore is applied.

The hull H is shown supported within the dry dock by the usual shores H', but, as it is not held absolutely in a fixed position, and its shape is liable to vary by expansion with changes of temperature, I prefer to provide such compensating springs for maintaining the pressure upon the bath holder when it is attached to the hull by tackle or by expansion shores. A spring $L^3$ is shown applied to the rope F which holds the bath holder B upon the right hand side of the hull H in Fig. 6, and such spring is stretched in a corresponding manner when the rope is tightened by the tackle F'. The spring thereafter operates to maintain an elastic tension upon the rope and to thus hold the bath holder firmly in position under any variation in its adjustment.

The abutment frame may be used to press a bath holder adjustably, (that is, with independent pressure upon different portions of the packing) against a concave surface, as illustrated in Fig. 27. In this construction, the auxiliary frame is attached loosely to the ends of the bath holder by dowel pins Q, and the set screws $s$ operate to press the middle of the bath inwardly and to hold the packing tightly against the concave surface at all the points required.

The bath holders so far described have been adapted by their flexible character to conform to a surface of tolerably uniform curve, as upon the bottom of the vessel and the greater part of its sides, but where the surface is irregular it is more convenient to build a sectional bath upward from the keel upon one or both sides of the vessel, and thus apply the plating solution to the entire irregular surface at once.

In thus operating, the keel, if desired, may be first plated by the means shown in Fig. 21, where $e$ and $e'$ represent the longitudinal and transverse bars forming the frame of the bath holder, upon which is carried the lining $b$. The packing is designated by the letter $c$ between the lining and the keel K' and the anode $b'$ is shown within the lining connected with the positive conductor N, the keel being connected with the negative conductor N'.

The clamping arms $k^2$ are shown embracing the frame of the bath holder, and extended below the same to receive a set screw $k^3$ in their ends, and a tie-bolt $k^4$ adjacent to the bottom of the bath. Such clamps would be applied at the ends of the bath holder at which points only the packing $c$ would be required, and the bolt $k^4$ may be regulated to tighten the joint at the bottom edge of the keel, while the set screw $k^3$ acts in opposition to the bolt to tighten the ends of the packing upon the upper part of the keel. A wedge $l^4$ is shown fitted to the lower ends of the jaws and supported upon a rigid seat $l^2$ by which the packing immediately beneath the keel may be held in close contact with the same. With such construction, a very trifling pressure exists within the bath holder and it may be made of any convenient length as ten or twenty feet, with suitable supports at intervals to sustain the weight; the packing $c$ confining the liquid at the extreme ends of the bath holder and being pressed firmly against the metallic surface by the means described.

Figs. 17 to 19 show the stern of a vessel with the stern bearing and the rudder post wholly inclosed in a bath holder built up from the floor of a dry dock. Fig. 18 shows a portion of the wall of the bath holder broken away adjacent to the stern post of the hull, and Fig. 17 shows a cross section of the bath holder on line $z, z$, in Fig. 19, which is a horizontal section on line $z', z'$, in Fig. 17.

I is the floor upon which the weight of the vessel would be sustained by blocks $a$ at suitable points forward of the stern; leaving room for a platform 1 beneath the keel adjacent to the stern, upon which the sectional bath holder is built.

A stopper 2 is shown inserted between the platform and the keel where the packing 3 is applied at the forward edge of the bath holder, and such stopper is made water tight against the platform and the keel. The bath holder is shown of triangular form with a post 4 at its apex in the rear of the rudder post 5, and sloping posts 6 are extended from the platform up toward the sides of the vessel at the forward end of the bath holder and intermediate to the ends. Beams or stringers 7 are stretched between the posts and faced internally with a boarding 8, and the lining of the bath holder, which is omitted from Figs. 17 to 19 on account of the smallness of the scale, is made water tight over the inner surface of the boarding and the platform 1 within the same. The wall of the bath holder is shown in Fig. 19 extended in a straight line from the rear post 4 to the first pair of sloping posts 6, and is then bent at a slight angle to the second pair of sloping posts; where gibs 9 are applied to the lining of the bath holder to press it against the side of the hull. As an irregular space exists between the sloping post and the wall of the vessel, the lining of the bath holder is extended across such space and supported by boards or plates 11, Fig. 20, which are held in place by knees or angle braces 12 affixed to the outside of the bath holder.

The braces are provided at the ends with set screws 13 adapted to press at intervals upon a gib 9 which is bent to conform to the curvature of the hull, and beneath which the lining $b$ is inserted with a yielding packing 14 adapted to compensate for irregularities in the surface of the hull.

The brackets 12 are shown in dotted lines in Fig. 17, but the set screws are omitted on account of the smallness of the scale. The stopper 2 furnishes a water tight junction at the forward end of the bath between the platform 1 and the keel K', and the pressing of the lining $b$ against the sides of such stopper and against the platform, as indicated by the dotted lines 15 in Fig. 17, closes the bath holder completely at the forward end. The bath holder would be extended up to or above the water line upon the hull, so as to plate the required portion of the surface. The surfaces to be plated would be suitably cleaned, and any apertures through the side of the vessel and the bearing for the propeller shaft would be blocked up and rendered water tight, and the bath holder could then be filled with the plating solution and an anode $b'$ introduced therein as shown in Figs. 17 and 20. The anode being connected with the positive conductor and the hull with the negative conductor, the copper would be deposited upon all the portions of the surface within the bath holder, including the stern bearing, the keel, the rudder post, &c.

Where the keel has been previously plated, the bath holder may be constructed without the platform by bringing the boarding 8 close to the bottom edge of the keel, and clamping the lining of the bath holder to the opposite sides of the keel by suitable clamps, thus forming a water tight bottom for the bath holder; within which the plating would be deposited continuous with the plating already upon the keel. The stem of the vessel may be plated by the same means as the keel, by the bath holder shown in Fig. 21, but the curvature is commonly so gradual upon the bow of an iron vessel, that the bath holder with flexible frames may be applied to plate the same without difficulty. Where it is desired, the stem of the vessel may be inclosed in a bath holder like that illustrated in Figs. 17 to 19, and both sides of the bow plated at the same time as far back from the stem as is desired.

Two sets of sloping posts 6 are shown in Figs. 18 and 19 to illustrate a means for inclosing an entirely transverse section of the vessel at any point between the stem and stern, as it is obvious that the end of the bath holder may be closed in like manner at both sets of posts, and a vertical strip of surface thus be inclosed upon the side of the hull. An alternate series of such strips may be readily plated and similar bath holders applied to the intervening strips to deposit the copper upon the intervening portions of the surface. By overlapping such deposits upon the portions of surface previously plated, the coating is made integral throughout.

In Figs. 1 and 7, dotted lines 17 are arranged to represent rectangular sections of plating overlapped upon one another to form an integral coating. Several bath holders are shown in Fig. 7 with their weight suspended by ropes 19 from pulley blocks 18. One or more bath holders may thus be adjusted upon the surface of a vessel and the pressure then applied to clamp the packing thereto, the means of support, as the rope 19, being retained, while the bath holder is in use, to prevent the falling of the bath holder if the clamping devices become relaxed, as would occur if supporting magnets were used and the electric current accidentally cut off. The bath holders are shown in Fig. 7 clamped or pressed toward the side of the vessel by the various devices shown in Fig. 6; excepting the shores L. At the left side of Fig. 7, two bath holders B³, clamped to the surface by magnets, are shown adjusted to form a deposit overlapping upon those previously made. To thus adjust the bath holders, the surface of the vessel after cleaning may be marked off, by chalk lines or paint, into spaces one or two inches less in dimensions than the internal size of the bath holder, and the bath holder when one end is set to such lines would overlap at the opposite end upon any plating previously deposited. Where a series of such sections is marked upon the surface of the vessel, a series of bath holders may be applied to the alternate sections as shown in Fig. 1, and after such sections are plated the bath holders may be shifted each to the adjoining section, which, owing to the previous measurements of the sections, would permit the succeeding deposit to be overlapped at both ends upon those already formed.

Where bath holders of rectangular form are applied to a warped surface, the edges of the deposit would not form level lines, and as a bath holder with an open top is preferably adjusted in a level position, the oblique edge of the previous deposit may be painted over with a non-conducting medium within a short distance of its edge, so that the succeeding deposit shall be united at such edge alone. Such a patch of paint 20 is indicated in Fig. 7, beneath the bath holders B³; the sloping dotted lines 21 immediately above such patch indicating the position which the bath holder would necessarily take if applied to a warped surface. The dotted lines 22 in the bath holder above the wedge of paint show the interior dimensions of the bath holder, which would be made of some standard size in feet or inches, to facilitate the laying out of the surface to adjust the baths. The surface of the vessel may be cleaned to receive the plating by any suitable means, and it is obvious that a portion of the surface may be plated while another portion is undergoing the cleaning operation, and the places thus plated and cleaned may be laid out with reference to uniting the sections by baths of standard dimensions. A bath holder four feet by ten would cover forty square feet of surface, and may be made so light by the methods of construction herein described, as to be handled and adjusted with great facility.

From the above description it will be seen that the invention consists essentially in depositing a series of definite overlapping sections upon the surface, it being impossible to plate an indefinite surface with a bath holder of given area. A bath holder of given area may however be adapted to plate a definite surface less than its own area by coating a portion of the surface with a non-conducting medium as just described.

This invention is readily distinguished from any method of coating the surface by washing or painting the same, as it involves the application of the plating solution to a definite section of the surface, and the retaining of such solution in contact with the surface for a definite length of time to produce an electro-metallic deposit of the desired thickness.

The art of electro plating is already well understood, so that the proper proportions of the anode and the current to produce a given deposit, may be readily determined, and this method therefore furnishes a means of securing a coating of positive thickness upon the hull of the vessel. It also furnishes a means of forming a deposit simultaneously upon the whole of any definite portion.

The apparatus for practicing my invention consists essentially in a bath holder adapted to retain the solution in contact with a definite portion of the surface to be plated, and having a packing at the margin with means for compressing the packing to form a water tight joint.

A flexible frame, when formed of suitable stiffness and applied to a convex surface, furnishes a means of compressing the packing in the proper degree at different portions of the margin; as the resistance of the frame to flexure, when its ends are pressed toward the surface, produces the pressure and contact required; but the packing may also be compressed at different portions of its margin by independent means, as the set screws illustrated in connection with the abutments in Figs. 11, 12 and 15, and in connection with the brackets in Fig. 20. The bath holders may be made at a very slight expense by the use of the perfectly flat lining shown in Figs. 4 and 29, as various kinds of waterproof material may be bought in such shape and readily secured upon the frame. A suitable packing interposed between the frame and the skin of the vessel then completes the bath holder, and fits it to perform its function.

The copper can be deposited most rapidly from a solution of copper sulphate, but such solution cannot be first applied to an iron surface, as the iron decomposes the same, and a cyanide solution may therefore be supplied to the baths by any suitable means when first secured in position, and when the iron surface is protected by the copper such solution may be withdrawn and replaced by a solution of copper sulphate. The bath holder may also be used as a means of cleaning the surface of the vessel after the paint is removed; by first supplying the bath holder with a suitable pickle of sulphuric acid, then drawing off such pickle from the bath holder, and then flooding the bath holder and the iron surface with clean water, and immediately filling the bath holder with the cyanide solution, to electro plate the same before it has become oxidized by exposure to the air. By the use of suitable inlets and outlets, like the thimbles *d* shown in Figs. 2 and 5, such fluids may be introduced at one edge of the bath holder and removed from the opposite edge of the same, so as to wash the entire surface of the iron to which the bath holder is applied. The deposition from a cyanide solution is greatly promoted by heating the solution, and where it is not convenient to introduce any heating appliances (as a steam pipe within the bath) a heated solution may be pumped or flowed continuously through the bath holder from a receptacle in which it is kept at the proper temperature. The means for thus feeding the bath holder is shown in Fig. 6, and other means may be employed where required.

What I claim herein is—

1. The method of forming an integral coating upon a large surface, which consists in depositing the metal in successive portions, constituting a series of definite overlapping sections, upon such surface, substantially as set forth.

2. The method of forming an integral metallic coating upon a large surface, which consists in first forming a metallic deposit upon alternate portions of said surface, and second forming upon the intermediate portions a similar metallic deposit, overlapping the previously formed deposit, as set forth.

3. The method of electro-plating a portion of the surface upon an object, which consists in confining a fluid bath of plating solution to such portion of the surface, passing an electric current through the bath to such surface and simultaneously passing a current of the plating solution through the bath, as herein set forth.

4. The method of electro-plating a portion of the surface upon an object, which consists in confining a fluid bath of plating solution to such portion of the surface, passing an electric current through the bath to such surface and simultaneously passing a current of heated plating solution through the bath, as herein set forth.

5. The method of electro-plating the under surface of an object, as the bottom of an iron vessel, which consists in confining a bath of plating solution to such under surface, passing an electric current through the bath to such surface, and maintaining the plating solution under pressure in contact with such surface, as herein set forth.

6. A bath holder for confining a plating solution in contact with one portion of an object, said bath holder having a yielding packing at the margin in combination with means for compressing the packing at different parts of the margin, an anode within the bath holder, and suitable electrical connections, substantially as herein set forth.

7. A bath holder for confining a plating solution in contact with one portion of an object, said bath holder having a flexible frame with packing at the margin, an anode within the bath holder, and suitable electrical connections, substantially as herein set forth.

8. A bath holder for confining a plating solution in contact with one portion of an object, said bath holder having a flexible frame, in combination with means for pressing upon parts of the frame independently to conform the same to a given object, as set forth.

9. A bath holder for confining a plating solution in contact with one portion of an object, said bath holder having a yielding packing at the margin, in combination with an abutment, and means connected with the abutment for conforming the packing to a given object, as set forth.

10. A bath holder for confining a plating solution in contact with one portion of an object, said bath holder having a flexible frame, in combination with an abutment, and means to press the frame from the abutment, substantially as herein set forth.

11. A bath holder for confining a plating solution in contact with one portion of an object, said bath holder having a flat frame in combination with a flat lining stretched over the same, and a yielding packing applied to the margin of the lining, as set forth.

12. A bath holder for confining a plating solution in contact with one portion of an object, said bath holder having a flat frame in combination with a flat lining stretched over the same, a yielding packing applied to the lining within the margin, and means outside of the packing for pressing the same upon the lining and thus holding the packing to the lining without perforating the same beneath the packing, as set forth.

13. A bath holder for confining a plating solution in contact with one portion of an object, said bath holder having a frame with a yielding packing at the margin, in combination with an abutment and electro-magnets to hold the abutment in a fixed position, as set forth.

14. A bath holder for confining a plating solution in contact with one portion of an object, said bath holder having a yielding packing at the margin, in combination with an abutment, means connected with the abutment for conforming the packing to a given object, and magnets to hold the abutment in a fixed position, substantially as herein set forth.

15. The combination, with a bath holder for retaining a plating solution in contact with one portion of an object, and means for pressing it upon such object, of a tank sustained above the level of the bath holder, and connections for leading the solution into and from the bath, as set forth.

16. The combination, with a bath holder for retaining a plating solution in contact with one portion of an object, of means for pressing the bath holder elastically toward the side of the object, as and for the purpose set forth.

17. The means for electro plating a section of a ship's hull, consisting in a bath holder for confining the plating solution to one portion of the hull, a fixed body adjacent to the bath holder, an extension shore inserted between the bath holder and the fixed body, an anode within the bath holder, and suitable electrical connections, as set forth.

18. The means for electro plating a section of a ship's hull, consisting in a bath holder for confining the plating solution to one portion of the hull, a fixed body adjacent to the bath holder, an extension shore inserted between the bath holder and the fixed body, and a spring compressed by the shore to press the bath holder elastically against the hull, substantially as herein set forth.

19. The means for plating sections upon opposite sides of a vessel's hull simultaneously, consisting in a bath holder having opposite parts, means for adjusting the opposite parts toward each other, an anode within the bath holder, and suitable electrical connections, substantially as herein set forth.

In testimony whereof I have hereunto set my hand in the presence of two subscribing witnesses.

THOMAS S. CRANE.

Witnesses:
L. LEE,
EDW. F. KINSEY.